United States Patent
Xia et al.

(10) Patent No.: US 9,365,705 B2
(45) Date of Patent: Jun. 14, 2016

(54) DEDICATED MATERIAL FOR MANUFACTURING SPECIAL SAFETY TIRE RUBBER FOR WHEELED COMBAT VEHICLES AND AIRCRAFT IN THE ARMY

(71) Applicants: Huasong Xia, Jinhua (CN); Kangkai Xia, Jinhua (CN)

(72) Inventors: Huasong Xia, Jinhua (CN); Kangkai Xia, Jinhua (CN)

( * ) Notice: Subject to any disclaimer, the term of this patent is extended or adjusted under 35 U.S.C. 154(b) by 0 days.

(21) Appl. No.: 14/394,959

(22) PCT Filed: Feb. 7, 2013

(86) PCT No.: PCT/CN2013/071487
§ 371 (c)(1),
(2) Date: Oct. 16, 2014

(87) PCT Pub. No.: WO2013/155892
PCT Pub. Date: Oct. 24, 2013

(65) Prior Publication Data
US 2015/0291781 A1    Oct. 15, 2015

(30) Foreign Application Priority Data

Apr. 16, 2012    (CN) .......................... 2012 1 0108702

(51) Int. Cl.
| | | |
|---|---|---|
| *C08K 5/00* | (2006.01) | |
| *C08K 5/16* | (2006.01) | |
| *C08L 9/00* | (2006.01) | |
| *B60C 1/00* | (2006.01) | |
| *C08G 77/04* | (2006.01) | |

(52) U.S. Cl.
CPC ... *C08L 9/00* (2013.01); *B60C 1/00* (2013.01); *B60C 1/0016* (2013.04); *B60C 1/0025* (2013.04); *C08G 77/04* (2013.01); *C08K 2201/01* (2013.01); *C08L 2205/03* (2013.01); *C08L 2666/44* (2013.01); *Y02T 10/862* (2013.01)

(58) Field of Classification Search
CPC ............................... C08L 9/00; C08L 2205/03
USPC ......................................................... 524/236
See application file for complete search history.

(56) References Cited

U.S. PATENT DOCUMENTS

| | | | |
|---|---|---|---|
| 7,368,506 | B2 | 5/2008 | Kanenari |
| 2006/0266454 | A1* | 11/2006 | Sandstrom ............ B60C 1/0016 152/209.1 |
| 2008/0004382 | A1 | 1/2008 | Kojima |
| 2009/0025847 | A1 | 1/2009 | Hochi |

FOREIGN PATENT DOCUMENTS

| | | |
|---|---|---|
| CN | 1705715 | 12/2005 |
| CN | 1876702 | 12/2006 |
| CN | 101096433 | 1/2008 |
| CN | 101353452 | 1/2009 |
| CN | 102627791 | 8/2012 |
| JP | 60-258235 | 12/1985 |

OTHER PUBLICATIONS

International Search Report dated May 16, 2013 issued in corresponding International patent application No. PCT/CN2013/071487.

* cited by examiner

*Primary Examiner* — Hui Chin
(74) *Attorney, Agent, or Firm* — Ostrolenk Faber LLP

(57) ABSTRACT

A dedicated material for manufacturing a special safety tire rubber for wheeled combat vehicles and aircraft in the army is disclosed, fabricated with, by weight, 28-40 parts of polyisoprene, 19-30 parts of silicone rubber, 15-25 parts of thermoplastic elastomer, 10-18 parts of magnetic powder, 10-15 parts of paraffin oil, 0.8-2 parts of flexibilizer, 5-10 parts of silicone oil, and 0.5-2 parts of antioxidant. The material has properties of ordinary tire rubber at a normal temperature, and resists high temperature, burning, flame, and aging in an extremely hot environment. The material resists bullets, pricking and explosion. The material can withstand attack of shells of light-weighted explosives.

3 Claims, No Drawings

DEDICATED MATERIAL FOR MANUFACTURING SPECIAL SAFETY TIRE RUBBER FOR WHEELED COMBAT VEHICLES AND AIRCRAFT IN THE ARMY

CROSS REFERENCE TO RELATED APPLICATIONS

The present application is a 35 U.S.C. §371 National Phase conversion of PCT/CN2013/071487, filed Feb. 7, 2013, which claims benefit of Chinese Application No. 201210108702.2, filed Apr. 16, 2012, the disclosure of which is incorporated herein by reference. The PCT International Application was published in the Chinese language.

FIELD OF INVENTION

The present invention discloses a dedicated material for manufacturing a special safety tyre rubber for wheeled combat vehicles and aircraft in the army.

BACKGROUND OF THE INVENTION

Wheeled combat vehicles and aircraft are undoubtedly of great importance in modern warfare. Meanwhile, flexible and efficient combat vehicles and aircraft are extremely probably affected by factors such as terrain and danger sources so that an action is hindered, operation is hard to accomplish and even people's life and security are endangered.

The dedicated material is different in respect of performance from some current safety tires: there is a safety tire filled with anti-leakage liquid, and its drawbacks are: easy corrosion at a wheel rim, uncomfortable travel, undesirable dynamic balance performance and easy damage to parent tire; there is a run-flat tire which is costly and can continue to run depending on support of a built-in skeleton in a deflation condition of the tire. However, once the safety performance of run-flat tire is exhibited, the product gets obsolete.

SUMMARY OF THE INVENTION

An object of the present invention is to provide a dedicated material for manufacturing a special safety tyre rubber for wheeled combat vehicles and aircraft in the army.

A new material is invented after long-term development and repeated experiments. The material is fabricated from the following components in parts by weight:
28-40 parts of polyisoprene, 19-30 parts of silicone rubber, 15-25 parts of thermoplastic elastomer, 10-18 parts of magnetic powder, 10-15 parts of paraffin oil, 0.8-2 parts of flexibilizer, 5-10 parts of silicone oil, and 0.5-2 parts of antioxidant.

The dedicated material is better than ordinary rubber and superior to flame retardant rubber, and may be used to manufacture radial tires, bias-ply tires and solid tires, and may be directly placed in a mold for vulcanization and made integral with the tire. The dedicated material has properties of ordinary tire rubber at a normal temperature, and also has characteristics such as resistant against high temperature, against burning, against flame and against aging. It can stand high temperature and combustion in a long time period and will not deform and damage. In this situation, physical performance of the dedicated material is substantially no different from that when at a normal temperature. The material according to the present invention can withstand 800-1200° C. high temperature in an extremely hot environment. When burnt at a high temperature, carcass surface will form a compact housing, and flames and combustion-supporting air cannot invade, and the longer an ambient high temperature lasts, more compact a resultant anti-fire layer becomes. The present invention may be used as a carcass material of a special safety tire marching in unfavorable environments such as rough terrain, a lot of sharp foreign matters, and high temperature and open fire to thoroughly solve these worries, and meanwhile the dedicated material can enable the combat vehicle and aircraft tires to have properties such as resistance against bullets, against prick and against explosion. Even if it is pricked, leakage will not occur. The material can withstand attack of shells of light-weighted explosives and effectively reduce and buffer damages caused by external energy. The special safety tire of wheeled combat vehicles and aircraft made of this material fill in a gap of the same class of products in China.

The tire fabricated from this dedicated material may form triple insurance if inflated with nitrogen.

The present invention requires a simple fabrication process and is more cost-effective and simpler in process as compared with the international same class of products. The dedicated material is recyclable and pollution-free.

DETAILED DESCRIPTION OF PREFERRED EMBODIMENTS

The present invention provides a dedicated material for manufacturing a special safety tyre rubber for wheeled combat vehicles and aircraft in the army, fabricated from the following components in parts by weight:
  28-40 parts of polyisoprene,
  20-30 parts of silicone rubber,
  15-25 parts of thermoplastic elastomer,
  10-18 parts of magnetic powder,
  10-15 parts of paraffin oil,
  0.8-2 parts of flexibilizer,
  5-10 parts of silicone oil, and
  0.5-2 parts of antioxidant.

The polyisoprene is one polyisoprene selected from a group consisting of polyisoprene rubbers IR565, IR LHIR70, IR560 and IR2200;

The silicone rubber is one silicone rubber selected from a group consisting of GM300, GM500, 110-2, TSE270-7U, and 3150;

The thermoplastic elastomer is one thermoplastic elastomer selected from butylbenzene rubbers 1778, SBR1500, SBS792, and SBS796;

The paraffin oil is one paraffin oil selected from a group consisting of DE-69, DY-36, HB and 300#;

The flexibilizer is selected from nonpolar high polymer and unsaturated acid or anhydride and is one flexibilizer selected from a group consisting of A-659HIPS, A-608PP, TP-165, and HR-189;

The silicone oil is one silicon oil selected from a group consisting of 2294H, 201, 5036D and KF-96-1000;

The magnetic powder is one magnetic powder selected from a group consisting of NAI, ZYBJ-1, JZA-103F and XZS;

The antioxidant is any one selected from compounds such as diphenylamine, p-diphenylamine and dihydroquinoline, and derivatives or polymers thereof.

The present invention further provides a method of fabricating a dedicated material for manufacturing a special safety tyre rubber for wheeled combat vehicles and aircraft in the army, comprising the following steps:
(1) placing the polyisoprene, silicone rubber, thermoplastic elastomer, magnetic powder, paraffin oil, flexibilizer, silicone oil and antioxidant in the above parts by weight into a mixer for pre-mixing 30-45 minutes;

(2) then adding a resultant pre-mixture into an internal mixer for sufficient internal mixing for a time period in a range of 120-200 minutes at a heating temperature in a range of 150-180° C., and obtaining a resultant material at a discharge port as the dedicated material according to the present invention. To achieve a better effect, the heating temperature is 155° C. and the mixing time is 200 minutes.

What is claimed is:

1. A dedicated material for manufacturing a safety tyre rubber for wheeled combat vehicles and aircraft in the army, fabricated from the following components in parts by weight:
    28-40 parts of polyisoprene,
    20-30 parts of a first elastomer comprising silicone rubber,
    15-25 parts of a second elastomer comprising thermoplastic elastomer,
    10-18 parts of magnetic powder,
    10-15 parts of paraffin oil,
    0.8-2 parts of flexibilizer,
    5-10 parts of silicone oil, and
    0.5-2 parts of antioxidant.

2. The dedicated material according to claim 1, wherein the antioxidant is any one selected from compounds such as diphenylamine, p-diphenylamine and dihydroquinoline, and derivatives or polymers thereof.

3. A method of fabricating a dedicated material for manufacturing a safety tyre rubber for wheeled combat vehicles and aircraft in the army, comprising the following steps:
    (1) placing the polyisoprene, silicone rubber, thermoplastic elastomer, magnetic powder, paraffin oil, flexibilizer, silicone oil and antioxidant into a mixer for pre-mixing 30-45 minutes;
    (2) then adding a resultant pre-mixture into an internal mixer for sufficient internal mixing for a time period in a range of 120-200 minutes at a heating temperature in a range of 150-180° C., and obtaining a resultant material at a discharge port as the dedicated material.

* * * * *